US009068667B2

(12) United States Patent
Miura et al.

(10) Patent No.: US 9,068,667 B2
(45) Date of Patent: Jun. 30, 2015

(54) ELECTROMAGNETIC VALVE

(71) Applicant: DENSO CORPORATION, Kariya, Aichi-pref. (JP)

(72) Inventors: Yuichiro Miura, Obu (JP); Hirofumi Onodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 163 days.

(21) Appl. No.: 13/678,663

(22) Filed: Nov. 16, 2012

(65) Prior Publication Data

US 2013/0134339 A1    May 30, 2013

(30) Foreign Application Priority Data

Nov. 30, 2011    (JP) .................................. 2011-261616

(51) Int. Cl.
*F16K 31/06* (2006.01)
*F02D 41/00* (2006.01)
*F02M 25/08* (2006.01)

(52) U.S. Cl.
CPC ......... *F16K 31/0655* (2013.01); *F02D 41/0032* (2013.01); *F16K 31/0693* (2013.01); *F02M 2025/0845* (2013.01); *F02M 25/0836* (2013.01)

(58) Field of Classification Search
CPC ............ F16K 31/0655; F16K 31/0693; F02M 25/0836; F02M 2025/0845; F02D 41/0032
USPC .................. 251/129.07, 129.15, 129.17, 337
See application file for complete search history.

(56) References Cited

U.S. PATENT DOCUMENTS

| 4,953,825 | A  | * | 9/1990  | Osumi et al. ............. | 251/129.17 |
| 6,561,482 | B2 | * | 5/2003  | Okii ......................... | 251/129.15 |
| 2002/0067994 | A1 | * | 6/2002 | Kimura et al. ........... | 251/129.15 |
| 2005/0217734 | A1 |   | 10/2005 | Takakura | |
| 2006/0207663 | A1 |   | 9/2006  | Tsuge | |
| 2008/0116409 | A1 | * | 5/2008  | Vaz De Azevedo ........... | 251/282 |

FOREIGN PATENT DOCUMENTS

| JP | S63-184280 U | 11/1988 |
| JP | 11-013604 A  | 1/1999  |
| JP | 2006-258135 A | 9/2006 |
| JP | 4203906 B2   | 1/2009  |

OTHER PUBLICATIONS

Office Action issued Dec. 3, 2013 in corresponding JP Application No. 2011-261616 (with English translation).

* cited by examiner

*Primary Examiner* — John Bastianelli

(57) ABSTRACT

An electromagnetic valve includes a flow passage, a valve member, an actuator having a coil and a movable core, an intermediate member, a connecting member, a housing, and a dividing unit. The housing includes a hollow part between the housing and the actuator. The hollow part communicates with the flow passage. The dividing unit includes a through hole which passes through the dividing unit in its axial direction. The dividing unit divides the hollow part between a communicating chamber that is capable of communicating with the flow passage, and a cancel chamber that is cut off from an outside thereof. The intermediate member includes a communicating passage between the intermediate member and the movable core. The communicating passage communicates between the flow passage and the cancel chamber via the through hole and the communicating chamber.

10 Claims, 7 Drawing Sheets

ELECTROMAGNETIC VALVE

CROSS REFERENCE TO RELATED APPLICATION

This application is based on Japanese Patent Application No. 2011-261616 filed on Nov. 30, 2041, the disclosure of which is incorporated herein by reference.

TECHNICAL FIELD

The present disclosure relates to an electromagnetic valve.

BACKGROUND

Conventional technologies will be described below. Conventionally, an evaporated fuel processor is known. The processor guides evaporated fuel from a fuel tank to a canister so that evaporated fuel is adsorbed into an adsorbent which is accommodated in the canister. After that, while a purge control valve is open, the processor introduces (purges) the evaporated fuel adsorbed in the canister into an intake pipe of an internal combustion engine (engine) by use of negative pressure of intake air. Accordingly, the processor prevents release of evaporated fuel into the atmosphere. For an example of an electromagnetic valve, an electromagnetic valve which is incorporated into the evaporated fuel processor is known (see, e.g., JP-A-2006-258135 corresponding to US2006/0207663A1).

As illustrated in FIG. 6, this electromagnetic valve (first example of the conventional technology) includes a valve 103 made of a nonmagnetic material that is engageable with a valve seat 102 of a housing 101; a valve 105 made of a nonmagnetic material that is engageable with a valve seat 104 of this valve 103; a shaft 106 made of a nonmagnetic material extending in an axial direction; and an electromagnetic actuator including a movable core 107 that is made of a magnetic material and coupled with the valve 105 via this shaft 106 to be movable integrally at least with the valve 105, a fixed core (a stator core 108 and a magnetic plate 109) made of a magnetic material that slidably holds this movable core 107, and a coil 110 that generates magnetic force, which attracts the movable core 107 to an attraction part side of the stator core 108, upon supply of electric power.

A spring 111 that urges the valve 103 in a valve opening direction is disposed between the housing 101 and the valve 103. A spring 113 that urges the valve 105 in a valve closing direction is disposed between the movable core 107 and a piece 112. A bellows 114 including a cylindrical portion having a bellows shape that can expand and contract in the axial direction is formed integrally with the valve 105. A retainer 115, which is fitted on an outer periphery of the shaft 106, is accommodated in this bellows 114. An annular outer circumferential edge (flange) formed on the actuator side of the bellows 114 is located between the housing 101 and the magnetic plate 109. Accordingly, the bellows 114 is accommodated in a hollow part (valve chamber) of the housing 101 to surround the shaft 106 and the retainer 115 in their circumferential direction.

The valve 105 is configured to be closed or opened corresponding to expansion or contraction movement of the bellows 114. For example, if a before-after pressure difference of the valve 105 (pressure difference between the inside and outside of the bellows 114) is large at the time of valve opening operation that that the valve 105 is disengaged from the valve seat 104 of the valve 103, the bellows 114 cannot contract smoothly, and the valve 105 is thereby not opened.

Accordingly, a pressure cancel mechanism that cancels out the before-after pressure difference of the valve 105 is provided for the electromagnetic valve.

The pressure cancel mechanism is configured such that a pressure cancel passage communicates between an internal space of the bellows 114 and a fluid passage 116 of the housing 101. Accordingly, the bellows 114 smoothly makes expansion or contraction movement in the axial direction by the inflow and outflow of fluid between the inside and outside of the bellows 114 through an opening that opens on the actuator side. Therefore, the valve 105 can be opened or closed in accordance with a displacement of the bellows 114. As illustrated in FIG. 6, the pressure cancel passage of the electromagnetic valve includes an opening 121 of the stator core 108, a clearance 122 between the movable core 107 and the stator core 108, a spring chamber 123, a communication hole 124 of the piece 112, an internal space 125 of the piece 112, a pressure release hole of a resin molding 126, and an internal passage of a hose 127. For the purpose of reduction of the operating noise by making the expansion and contraction movement of the bellows 114 serve to produce a damper effect, the electromagnetic valve reduces its operating noise by producing the damper effect through the reduction of a cross-sectional area of a passage from the internal space of the bellows 114 to the pressure cancel passage.

For another example of the electromagnetic valve, an electromagnetic air control valve (electromagnetic valve) having the pressure cancel mechanism is known (see, e.g., JP-A-H11-01360). As illustrated in FIG. 7, this electromagnetic valve includes a valving element 203 that is engageable with a valve seat 202 of a valve Main body 201; a valving element supporting member 204 that supports this valving element 203; and an electromagnetic actuator having a movable core 205 made of a magnetic material that is coupled with the valving element 203 and the valving element supporting member 204 to be movable integrally therewith, a fixed core (a stator core 206 and a housing 207) made of a magnetic material that slidably supports this movable core 205, and a coil 208 that generates magnetic force, which attracts the movable core 205 to an attraction part side of the stator core 206, upon supply of electric power. A spring 211 that urges the valving element 203, the valving element supporting member 204, and the movable core 205 in a valve opening direction is disposed between the valving element 203 and an adjustment screw 209. A spring 212 that urges the valving element 203, the valving element supporting member 204, and the movable core 205 in a valve closing direction is disposed between the movable core 205 and the stator core 206.

An annular diaphragm 215 that separates a hollow part of the valve main body 201 between a pressure cancel chamber 213 and an air passage 214 is disposed in the electromagnetic valve. This diaphragm 215 has an annular central part in its center, and includes an annular outer peripheral part on its outer side. In this electromagnetic valve, the central part of the diaphragm 215 is held between the valving element 203 and the movable core 205, and the outer peripheral part of the diaphragm 215 is clamped at a contact part between the valving element 203 and the housing 207. Accordingly, the pressure cancel chamber 213 is formed, so that the diaphragm 215 can be easily attached in the hollow part of the valve main body 201. In the pressure cancel mechanism of the electromagnetic valve, the pressure cancel chamber 213 and the air passage 214 communicate through a pressure hole 221 of the valving element supporting member 204 and a pressure hole 222 of the movable core 205. The pressure hole 221 is configured as a longitudinal hole passing through the valving element supporting member 204 in its axial direction. The pressure hole 222 includes a vertical hole with a bottom part that extends in the axial direction of the movable core 205, and a horizontal hole that extends in a direction perpendicular to the axial direction of the movable core 205 to face the pressure cancel chamber 213.

The electromagnetic valve described in JP-A-2006-258135 (first example of the conventional technology) is a configuration which delays responsivity of the movable core 107. Thus, the electromagnetic valve is not suitable for the case of improvement of control responsivity. The fluid in the internal space of the bellows 114 needs to flow into the pressure cancel passage (including the spring chamber 123, the communication hole 124, the internal space 125, the pressure release hole, and the internal passage of the hose 127) through the narrow clearance 122 between the movable core 107 and the stator core 108. Moreover, the pressure cancel passage is configured to pass through the hose 127 disposed outside the electromagnetic valve, and the valve is therefore disadvantageous in its size and cost.

In the electromagnetic valve described in JP-A-H11-013604 (second example of the conventional technology), the horizontal hole needs to be formed through the movable core 205. Since the horizontal hole is formed in a radial direction of the core 205 perpendicular to the axial hole (central hole) of the movable core 205, change of a direction of the core 205 and re-chuck of the core 205 are necessary at the time of boring through the movable core 205, and high manufacturing costs of the electromagnetic valve are thereby required. If a gap (clearance) between the movable core 205 and the fixed core (the stator core 206 and the housing 207) is made smaller than FIG. 7 to improve efficiency of a magnetic circuit although the pressure cancel passage is not formed on a rear side of the movable core 205, the fluid (e.g., air and oil) on the rear side needs to flow into the pressure cancel chamber 213 through the small clearance at the time of the valve operation. Accordingly, the damper effect is produced, and thus, an elapsed time (valve opening response time) after the start of energization of the coil 208 until the valving element 203 actually begins to open is increased.

For the purpose of solving the above-described issue, the central passage of the movable core 205 may be configured to be a through hole passing through the movable core 205 in its axial direction to communicate between the space of the movable core 205 on the valving element side (lower end side in FIG. 7) and the space of the movable core 205 on the rear side. However, for its coexistence with the pressure cancel passage, similar to the above, cost rising due to boring of the horizontal hole is unavoidable.

SUMMARY

The present disclosure addresses at least one of the above issues.

According to the present disclosure, there is provided an electromagnetic valve including a flow passage, a valve member, an actuator, an intermediate member, a connecting member, a housing, and a dividing unit. Fluid flows through the flow passage. The valve member reciprocates in its axial direction to open or close the flow passage. The actuator includes a coil and a movable core. The coil is configured to generate magnetic force upon supply of electric power. The movable core is displaced in the axial direction due to the magnetic force generated by the coil so as to drive the valve member. The intermediate member is disposed between the valve member and the movable core. The connecting member connects together the valve member, the movable core, and the intermediate member in an integrally movable manner. The housing accommodates the valve member, the movable core, the intermediate member, and the connecting member in a reciprocatable manner, and includes a hollow part between the housing and the actuator. The hollow part communicates with the flow passage. The dividing unit is provided for the valve member or the intermediate member and includes a through hole which passes through the dividing unit in its axial direction. The dividing unit divides the hollow part between a communicating chamber that is capable of communicating with the flow passage, and a cancel chamber that is cut off from an outside thereof. The intermediate member includes a communicating passage between the intermediate member and the movable core. The communicating passage communicates between the flow passage and the cancel chamber via the through hole and the communicating chamber.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
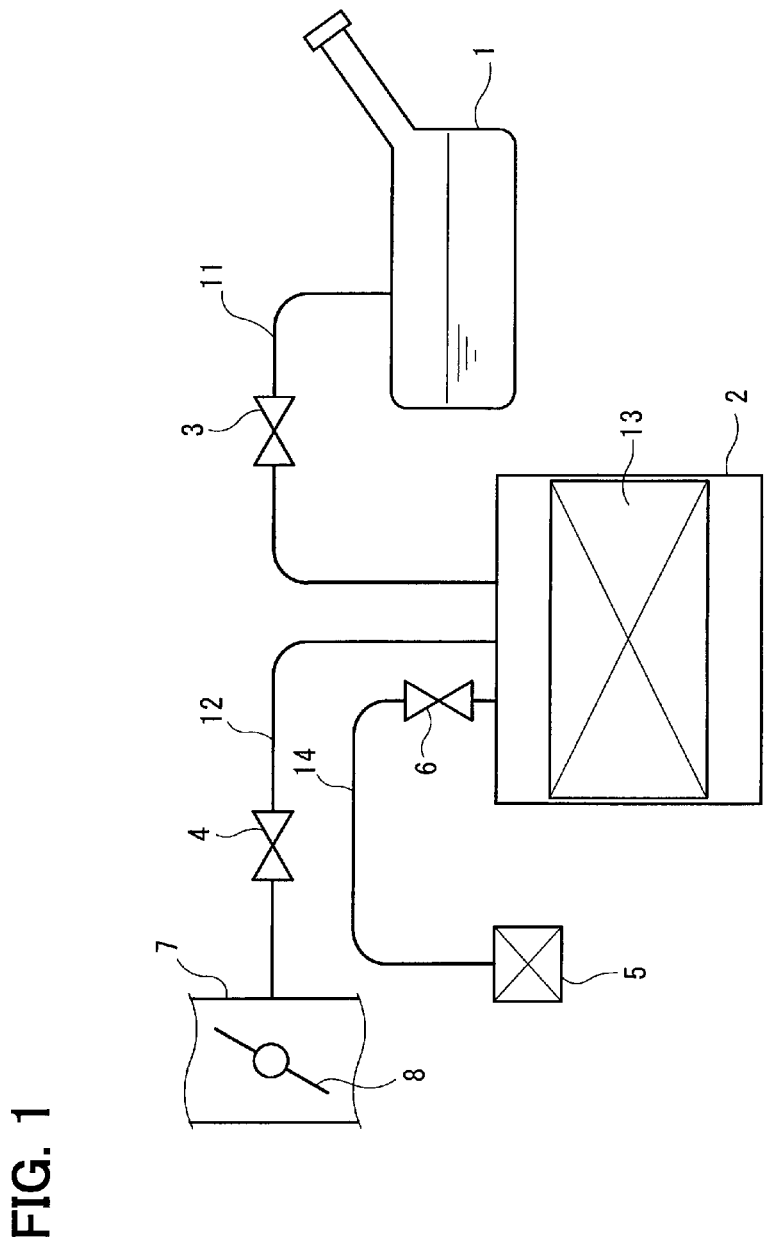
FIG. 1 is a diagram illustrating a configuration of an evaporated fuel processor (fuel tank sealing system) in accordance with a first embodiment.
Figure 2:
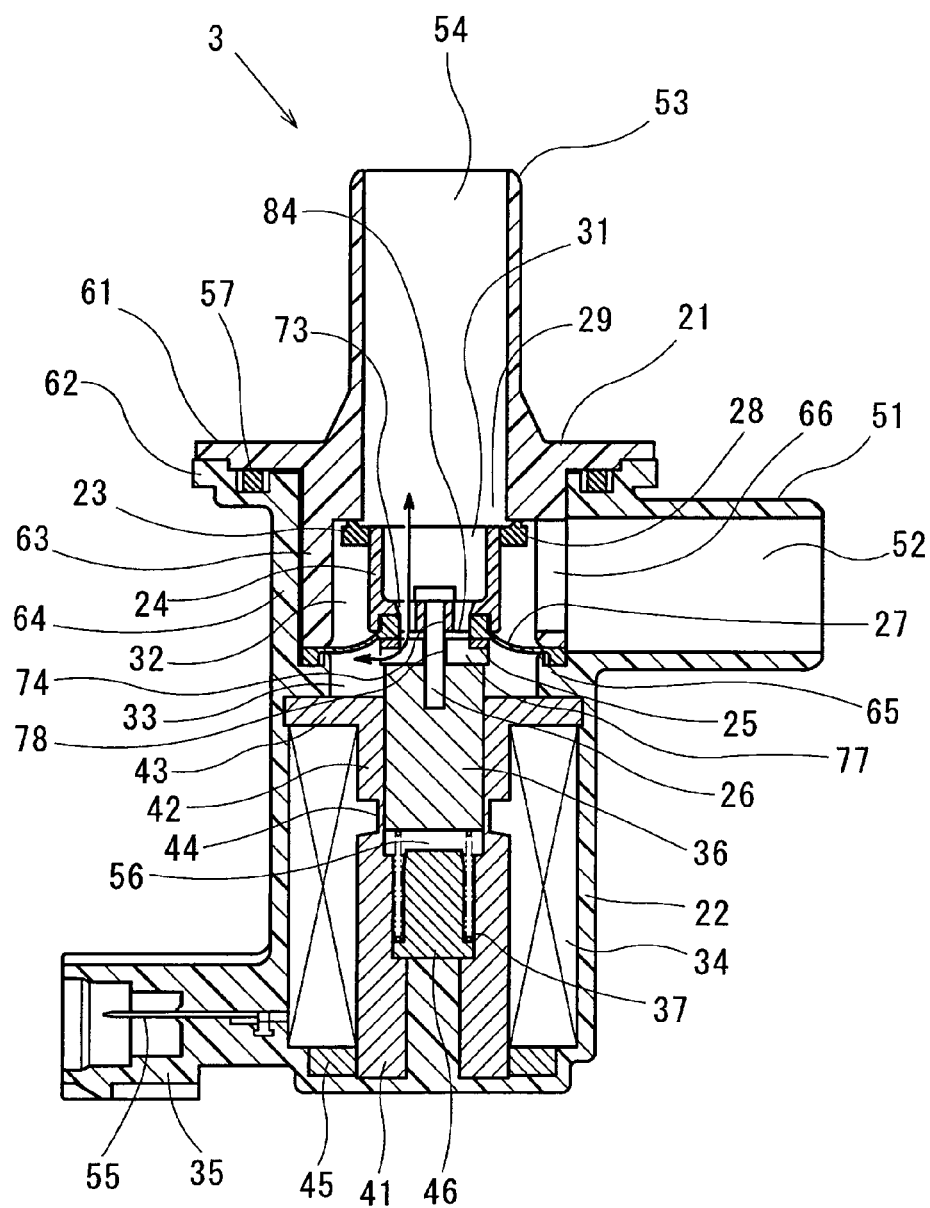
FIG. 2 is a sectional view illustrating an electromagnetic valve which is applied to an electromagnetic tank sealing valve according to the first embodiment.
Figure 3A:
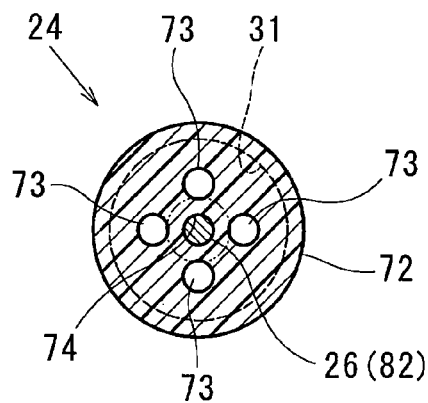
FIG. 3A is a cross-sectional view taken along a line IIIA-IIIA in FIG. 3B according to the first embodiment.
Figure 3B:
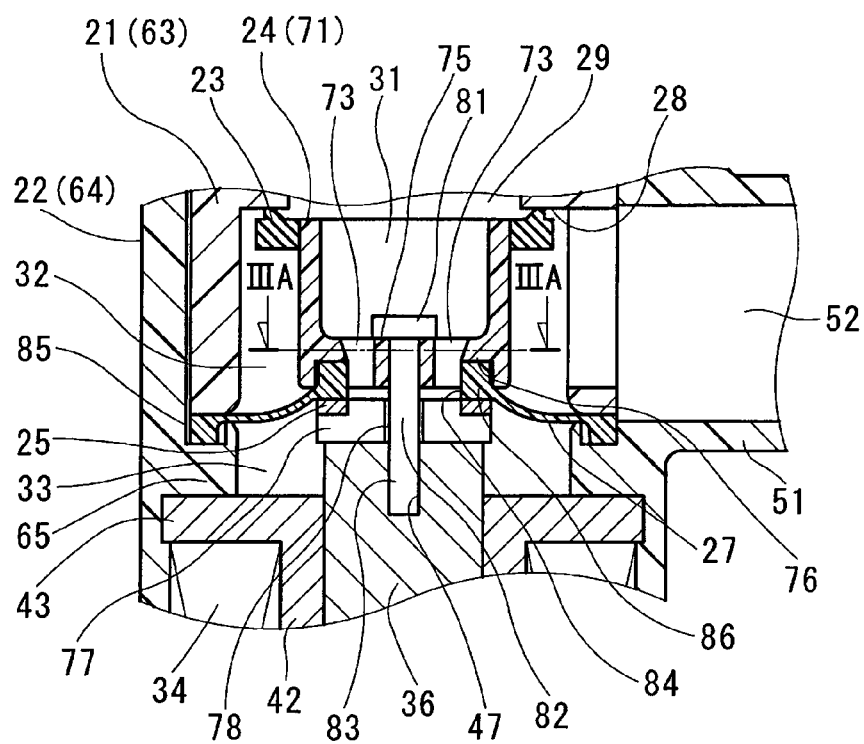
FIG. 3B is a sectional view illustrating a main structure of the electromagnetic valve of the first embodiment.
Figure 4A:
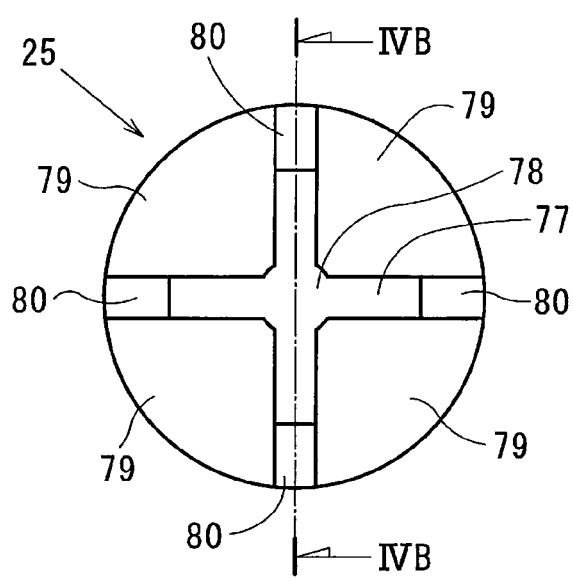
FIG. 4A is a front view illustrating a ring collar according to the first embodiment.
Figure 4B:
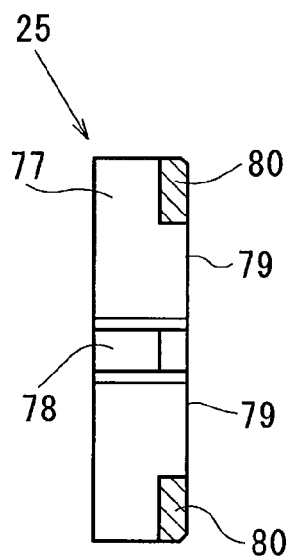
FIG. 4B is a sectional view taken along a line IVB-IVB in FIG. 4A according to the first embodiment.

Embodiments will be described in detail below with reference to the drawings. In an electromagnetic valve of the present disclosure, a through hole communicating with a chamber is formed through a film-like diaphragm or a bellows, and a communicating passage that communicates between a passage and a cancel chamber via the through tube and the chamber is formed between an intermediate member and a movable core. Accordingly, the cancel chamber and the passage communicate with each other, and a valve member, the diaphragm, and the intermediate member are accommodated in a housing so that they can reciprocate in the housing. As a result, a pressure cancel structure is configured at low cost; control responsivity of the valve member (valve opening responsivity or valve closing responsivity) is improved; and a pressure cancel mechanism is downsized (compactified) to improve installability of the valve to a vehicle and so forth.

First Embodiment

Configuration of an electromagnetic valve of a first embodiment will be described below. FIGS. 1 to 4B illustrate the first embodiment.

An evaporated fuel processor of the present embodiment includes a fuel tank sealing system that can seal a fuel tank 1 by closing an electromagnetic valve 3 disposed between the fuel tank 1 and a canister 2. This fuel tank sealing system is disposed in a vehicle such as a hybrid vehicle that travels with an internal combustion engine and an electric machinery (motor) as its power source. The fuel tank sealing system includes the fuel tank 1, the canister 2, the electromagnetic valve 3, a purge control valve 4, an air filter 5, and a canister control valve 6. The system is connected to an intake pipe 7 communicating with a combustion chamber for each cylinder of the engine.

A multi-cylinder gasoline engine which has more than one cylinder is used for the engine. Nevertheless, the engine is not limited to a multi-cylinder gasoline engine, and a single cylinder gasoline engine may be employed for the engine. The engine generates engine output using heat energy obtained by combusting in the combustion chamber the mixture of clean intake air which has been filtered through an air cleaner (air cleaner for the internal combustion engine) and fuel injected from an injector. The intake pipe 7 defining an intake passage through which the intake air that has passed through the air cleaner flows, and an exhaust pipe (not shown) defining an exhaust passage through which exhaust gas discharged from the combustion chamber flows are connected to the engine. An intake throttle valve 8 for adjusting a flow rate of intake air which flows in the intake passage communicating with the inside of the combustion chamber for each cylinder of the engine is disposed in the intake pipe 7.

The fuel tank 1 communicates with an inlet port of the canister 2 via a connecting pipe 11. The electromagnetic valve 3 is provided for the connecting pipe 11. A pressure sensor (tank internal pressure sensor: not shown) that detects pressure in the fuel tank 1 (tank internal pressure) is provided for the fuel tank 1. The canister 2 communicates with a purge gas introduction port of the intake pipe 7 via the connecting pipe 12. This connecting pipe 12 is connected to a downstream side of the throttle valve 8 in a flow direction of intake air (engine intake-port side). A purge control valve 4 for adjusting a purge amount of evaporated fuel (evaporation gas, purge gas) is provided for the connecting pipe 12.

An adsorbent (e.g., activated carbon) 13 which adsorbs evaporated fuel is accommodated in the canister 2. An atmosphere release pipe 14 opened to the atmosphere is connected to an atmosphere open hole of this canister 2. The air filter 5 that filters air flowing into the canister 2 is provided for an outside air introduction port of this atmosphere release pipe 14. The air flowing in through an inlet part (atmosphere open hole) of the atmosphere release pipe 14 can pass through this air filter 5. The air filter 5 captures foreign substances mixed into the air, thereby preventing the entry of foreign substances into the intake pipe 7. The canister control valve 6, which closes the atmosphere open hole of the canister 2 when needed, is provided for the atmosphere release pipe 14. This canister control valve 6 is a canister control valve, which is a normally-open type electromagnetic opening and closing valve.

In the present embodiment, while the hybrid vehicle including the fuel tank sealing system is traveling by the motor, negative pressure is not produced in the intake passage of the intake pipe 7. Accordingly, the evaporated fuel adsorbed by the adsorbent 13 in the canister 2 cannot be fed into the intake passage of the intake pipe 7. Therefore, the electromagnetic valve 3 disposed between the fuel tank 1 and the canister 2 is closed (fully-closed) to close (seal) the fuel tank 1 in order to prevent an overflow of evaporated fuel due to the adsorption of too much evaporated fuel by the adsorbent 13 in the canister 2.

In the fuel tank sealing system, an opening signal is inputted into an engine control unit (electromagnetic valve control device: electrical control unit (ECU)) that controls the fuel tank sealing system through the operation of a fill opening lever (not shown) having an opening switch (not shown) and so forth by a driver of the vehicle when feeding fuel to the fuel tank 1. The ECU, into which the opening signal is inputted, opens (fully opens) the electromagnetic valve 3. Accordingly, the connecting pipe 11 that connects the fuel tank 1 and the canister 2 is made open. As a result, the pressure of the fuel tank 1 can be reduced to the atmospheric pressure, and even though a cap of the fuel fill opening is opened, the release of evaporated fuel into the outside air (atmosphere) from the fuel tank 1 through the fuel fill opening can be prevented.

Details of the electromagnetic valve 3 of the present embodiment will be described with reference to FIGS. 1 to 4B. The electromagnetic valve 3 is incorporated into the fuel tank sealing system which is a type of the evaporated fuel processor. In addition, the evaporated fuel processor is an evaporation fuel processing system whereby the evaporated fuel, which has been evaporated (volatilized) in the fuel tank 1, is introduced (purged away) into the intake passage of the intake pipe 7 via the canister 2 by use of intake air negative pressure to prevent the release of evaporated fuel into the atmosphere.

The electromagnetic valve 3 includes a housing coupled with the connecting pipe 11 in the fuel tank sealing system. This housing is constituted of two divided cases including a valve case (first mold resin case) 21 made of synthetic resin having therein a valve assy (assembly) and a solenoid case (second mold resin case) 22 made of synthetic resin having therein an electromagnetic actuator. As for the electromagnetic valve 3, the valve assy and the electromagnetic actuator integrated in the respective cases are joined and united through swaging fixation or fastening fixation together of the valve case 21 and the solenoid case 22 with a joining end face of the valve case 21 and a joining end face of the solenoid case 22 joined together.

The valve assy includes the valve case 21, a valve member (a rubber valve 23 and a valve holder 24), a collar plate 25, a shaft 26, and a diaphragm 27. An annular valve seat 28, with which the rubber valve 23 is engageable, is formed on the valve case 21. A passage hole 29, through which the evaporated fuel passes, is formed in this valve seat 28.

The valve case 21 includes a hollow part (internal space) communicating with the passage hole 29 between the electromagnetic actuator and the solenoid case 22, and the case 21. By the diaphragm 27, this hollow part is separated (divided) between two chambers (spaces) including a chamber (an in-valve communication chamber 31 and an out-of-valve communication chamber 32) that communicates with the passage hole 29, and a pressure cancel chamber 33 that is airtightly cut off of the external environment of the electromagnetic valve 3. In the hollow part of the housing, the rubber valve 23, the valve holder 24, the collar plate 25, and the shaft 26 are accommodated such that they can reciprocate in the hollow part.

The electromagnetic actuator includes the solenoid case 22, a solenoid coil 34, an external connection connector 35, a movable core (moving core) 36, a return spring 37, a coil inner peripheral side fixed core (stator cores 41, 42 and a magnetic resistance part 44), a coil outer side fixed core (yoke 45), and a stopper 46. A cylindrical flow passage pipe (inlet pipe) 51 extending outward in the radial direction perpendicular to a displacement direction of the valve member is provided for the solenoid case 22. A fluid passage (inlet port) 52 that communicates with the passage hole 29 of the valve seat 28 and is located on an upstream side of the chamber in a gas flow direction is formed in this inlet pipe 51.

A cylindrical flow passage pipe (outlet pipe) 53 extending outward in in the same direction as the displacement direction of the valve member is provided for the valve case 21. A fluid passage (outlet port) 54 that communicates with the passage hole 29 and is located on a downstream side of the passage hole 29 in the gas flow direction is formed in this outlet pipe 53. Details of the housing of the present embodiment (the valve case 21 and the solenoid case 22) and the valve assy (the rubber valve 23, the valve holder 24, the collar plate 25, the shaft 26, and the diaphragm 27) will be described later in the description.

The electromagnetic actuator includes the solenoid coil 34 that generates a magnetic flux therearound upon energization; the external connection connector 35 for connecting this solenoid coil 34 and an external circuit (external power or external control circuit: ECU); the movable core (moving core) 36 made of a magnetic material; the return spring 37 that urges a movable body (the valve member, the shaft 26, and the moving core 36) in the valve closing direction; the coil inner peripheral side fixed core (the stator cores 41, 42, and the magnetic resistance part 44) made of a magnetic material that forms a magnetic path on an inner peripheral side of the solenoid coil 34; the coil outer side fixed core (yoke 45) made of a magnetic material that forms a magnetic path on the outer side of the solenoid coil 34; and the stopper 46 fitted and held in the stator cores 41, 42.

The solenoid coil 34 is a magnetic flux generating means (magnetic force generating means) for generating magnetic force which attracts the moving core 36 toward a magnetic attraction part of the stator cores 41, 42 upon supply of electric power (upon application of an electric current or upon energization). Upon energization of the solenoid coil 34, a magnetic circuit along which the magnetic flux passes concentratedly through the moving core 36, the stator cores 41, 42, the yoke 45 and so forth is formed. The solenoid coil 34 drives the rubber valve 23, the valve holder 24, the shaft 26, and the moving core 36 by the magnetic force in the valve closing direction. The solenoid coil 34 is a solenoid coil, obtained by winding multiple times a conducting wire covered with an insulating film around a coil bobbin (not shown) made of synthetic resin having insulation properties.

The solenoid coil 34 includes a coil part wound on the bobbin and a pair of coil end leads pulled out from this coil part. The pair of coil end leads is connected to an external circuit (external power and external control circuit: ECU) via a terminal (external connection terminal) 55 of the external connection connector 35. In addition, an outer peripheral part of the solenoid coil 34, and conduction joint parts (connection parts) between the respective coil end leads of the solenoid coil 34 and the terminals 55 are covered in the solenoid case 22 made of synthetic resin having insulation properties (mold resin material) and protected. An outer peripheral part of the solenoid case 22 is configured as a connector case for the external connection connector 35 from which ends of a pair of the terminals 55 are exposed and which accommodates the terminals 55.

The moving core 36 is made of magnetic metal (e.g., ferromagnetic material such as iron) excited (magnetized) upon energization of the solenoid coil 34. The moving core 36 is a magnetic movable body that serves as a part of the magnetic circuit formed upon energization of the solenoid coil 34. The moving core 36 is a movable core (plunger) that can slidably reciprocate in the stator cores 41, 42 in their axial direction. This moving core 36 is urged toward the valve seat of the valve case 21 along with the valve member and the shaft 26 by urging force of the return spring 37. A spring seat part holding a first coil end of the return spring 37 is provided for the moving core 36. The moving core 36 includes a contact surface that is brought into contact with an end face of the collar plate 25, and a recess that opens on this contact surface and extends straightly in the axial direction from this opening side to a lower side. This recess is formed on the axis line of the moving core 36 and includes an axial hole (press fitting hole) 47 into which a basal part of the shaft 26 is press-fitted.

The return spring 37 is accommodated expandably and contractably in a spring accommodating chamber 56 formed between the moving core 36 and the stopper 46. This return spring 37 is a valve urging means (valve spring) for applying urging force (spring load, spring force) that urges the valve member (the rubber valve 23, the valve holder 24, and so forth) toward the valve seat 28, to the moving core 36. The return spring 37 includes a coil that is wound in a spiral manner between the spring seat part of the moving core 36 and the spring seat part of the stopper 46. The annular first coil end that is in contact with the spring seat part of the moving core 36 is provided on one side of the coil of the return spring 37 in its axial direction. The annular second coil end that is in contact with the spring seat part of the stopper 46 is provided on the other side of the coil of the return spring 37 in its axial direction.

A magnetic stator including the coil inner peripheral side fixed core and the coil outer side fixed core is a magnetic fixed body made of magnetic metal (e.g., ferromagnetic material such as iron) excited (magnetized) upon energization of the solenoid coil 34. The coil inner peripheral side fixed core includes the stator cores 41, 42 that slidably support the moving core 36 in its axial direction. This stator core 42 is an integral part formed from a magnetic material by integrating a cylindrical first fixed core that includes an annular flange 43 that covers one end side of the solenoid coil 34 in its axial direction, a cylindrical second fixed core that is disposed coaxially with a cylindrical part of this first fixed core, and the magnetic resistance part 44 that reduces the flow of magnetic flux between the two first and second fixed cores.

The magnetic resistance part 44 is configured by a thin wall part connecting the two first and second fixed cores. The yoke 45 includes an annular bottom part covering one end side of the solenoid coil 34 in its axial direction, and a sleeve covering the outer side of the solenoid coil 34. The stopper 46 serves as a restriction part that restricts a displacement distance of a movable member including the rubber valve 23, the moving core 36, and the shaft 26 in the axial direction. This stopper 46 is fitted into a fitting hole formed at the central part of the stator core 41. A spring seat part that holds the second coil end of the return spring 37 is provided for the stopper 46.

Details of the valve case 21 of the present embodiment will be described with reference to FIGS. 1 to 4B. The valve case 21 is integrally formed from synthetic resin. This valve case 21 includes a hollow part formed between the solenoid case 22 for the electromagnetic actuator and the flange 43 of the stator core 42. A first flange 61 that is joined airtightly on the joining end face of the solenoid case 22 with a sealant 57 such as sealing rubber between the flange 61 and the case 22, is provided for the valve case 21. A second flange 62 that is opposed to the first flange 61 of the valve case 21 is provided for the solenoid case 22.

A projecting wall (inner sleeve) 63 having a partially cylindrical shape that projects toward the coil in a direction parallel to the axial direction from an inner circumferential part of the first flange 61 is formed integrally with the valve case 21. A peripheral wall (outer sleeve) 64 that surrounds the inner sleeve 63 of the valve case 21 partially in the circumferential direction is formed integrally with the solenoid case 22. An annular inner peripheral protrusion 65 that projects toward the moving core 36 from an inner peripheral surface of the outer sleeve 64 to cover an outer circumferential part of the flange 43 of the stator core 42 is provided for the solenoid case 22 entirely in the circumferential direction (along the entire circumference).

The outlet port (canister side flow passage) 54 is formed in the outlet pipe 53 of the valve case 21. The inlet port (tank side flow passage) 52 is formed in the inlet pipe 51 of the solenoid case 22. The annular valve seat 28, with which the rubber valve 23 is engageable, is formed on the valve case 21. The passage hole 29, through which the evaporated fuel passes, is formed in this valve seat 28. The valve seat 28 is provided along an opening circumferential edge of the passage hole 29. The passage hole 29 communicates with the inlet port 52 through a notch (fluid passage port) 66 formed at the inner sleeve 63 of the valve case 21, and the chamber (the in-valve communication chamber 31 and the out-of-valve communication chamber 32). The passage hole 29 communicates between the hollow part of the valve case 21 and the outlet port 54, and is opened or closed by the rubber valve 23.

Details of the valve member (the rubber valve 23 and the valve holder 24) of the present embodiment will be described with reference to FIGS. 1 to 4B. The rubber valve 23 is configured by an annular rubber elastic body (e.g., synthetic rubber such as fluorine-contained rubber or silicone rubber), and is a seal valve that is engaged with the valve seat 28 to close the passage hole 29. This rubber valve 23 is a valving element of a normally-closed type electromagnetic opening and closing valve. The rubber valve 23 is fixed to an outer periphery of an end of a valve sleeve 71 of the valve holder 24. At the time of opening the rubber valve 23, the rubber valve 23 is separated (disengaged) from the valve seat 28 of the valve case 21 to open the passage hole 29. Accordingly, the fuel tank 1 and the canister 2 communicate with each other via the connecting pipe 11. At the time of closing the rubber valve 23, the rubber valve 23 is engaged with the valve seat 28 to close the passage hole 29. Accordingly, a communicating state between the fuel tank 1 and the canister 2 is closed to seal the fuel tank 1.

The valve holder 24 is formed from synthetic resin having insulation properties (mold resin material) into a cylindrical shape with a bottom (cup shape). This valve holder 24 surrounds the chamber (the in-valve communication chamber 31) in the circumferential direction, and includes the valve sleeve 71 extending straightly in the direction parallel to the axial direction. The valve sleeve 71 separates (divides) the chamber formed between the valve seat 28 of the valve case 21 and the diaphragm 27 between the in-valve communication chamber 31 that communicates constantly with the passage hole 29, and the out-of-valve communication chamber 32 that communicates with the passage hole 29 when the rubber valve 23 is opened. One end side of the valve sleeve 71 (upper end side in FIG. 3B) opens, and the other end side (lower end side in FIG. 3B) is closed.

A blocking part 72 having a shape of a circular disc that closes the other end side of the in-valve communication chamber 31 is provided on the other end side of the valve sleeve 71. This blocking part 72 has a larger thickness than the valve sleeve 71. More than one (four) through holes 73 that pass through this blocking part 72 in its axial (thickness) direction are formed through the blocking part 72. One insertion hole 74 in which a projecting shaft part of the shaft 26 is inserted is formed at the central part of the blocking part 72. The through holes 73 are circular holes extending in the direction parallel to the axial direction of the valve holder 24, and provided at regular intervals around the insertion hole 74 in the circumferential direction. These through holes 73 communicate constantly with the passage hole 29 and the outlet port 54 through the in-valve communication chamber 31. The insertion hole 74 is a circular hole extending in the direction of the axis line of the valve holder 24, and is a second insertion hole that is located coaxially with a press fitting hole 47 and passes through the blocking part 72 in the axial direction. The projecting shaft part of the shaft 26 is fitted in this insertion hole 74.

The valve holder 24 includes an engaged part 75 that is engaged with a flanged part of the shaft 26 at the central part of the blocking part 72 (opening circumferential edge of the insertion hole 74). As described above, the valve holder 24 is engaged with the flanged part of the shaft 26, so that the rubber valve 23, the valve holder 24, and the collar plate 25 are coupled with the moving core 36 to be capable of moving together with the moving core 36. An engaging part (opposed part) 76 that clamps an inner circumferential end rim of the diaphragm 27 between the collar plate 25 and the engaging part 76 is provided around the through hole 73 of the blocking part 72.

The collar plate 25 is an intermediate member made of a nonmagnetic material such as synthetic resin or metal, and is configured as a different component from the rubber valve 23, the valve holder 24, the shaft 26, and the moving core 36. This collar plate 25 is in contact with an end face of the blocking part 72 of the valve holder 24 via the diaphragm 27, and is coupled with the rubber valve 23, the valve holder 24, and the moving core 36 by the shaft 26 such that the plate 25 can be displaced integrally therewith, with the plate 25 in direct contact with the contact surface of the moving core 36. The collar plate 25 includes a cross-shaped communicating passage 77 that communicates between the passage hole 29 and the pressure cancel chamber 33, between the contact surface of the moving core 36 and the plate 25. This communicating passage 77 includes an axial passage that is located on the axis line of the collar plate 25 and extends straightly in the direction of the axis line of the collar plate 25, and radial passages that extend outward in a radial direction that is perpendicular to the axis line of the collar plate 25.

An insertion hole 78 in which the shaft 26 is inserted is formed at the central part of the communicating passage 77. The insertion hole 78 is a first insertion hole that is located coaxially with the press fitting hole 47 and the insertion hole 74 and passes through the plate 25 in the axial direction. Each radial portion of the communicating passage 77 is formed between its adjacent partition walls (blocks) 79 having the shape of a fan provided for the collar plate 25. Each radial passage of the communicating passage 77 is formed between its adjacent fan-like partition walls 79 and partition walls (blocks) 80. The partition walls 79, 80 of the collar plate 25 are provided at regular intervals in the circumferential direction to clamp the inner circumferential end rim of the diaphragm 27 between the engaging part 76 of the valve holder 24 and the walls 79, 80.

The shaft 26 is a connecting member made of nonmagnetic material such as synthetic resin or metal that couples together the rubber valve 23, the valve holder 24, the collar plate 25, and the moving core 36 so that they can be integrally displaced. The shaft 26 is disposed in the axis line of the valve assy and the moving core 36, and includes an axial part that extends straight in a direction of the axis line of the moving core 36, and a flanged part (engaging part, flange) 81 that is provided at one end of this axial part to be engaged with the engaged part 75 of the valve holder 24. An outer diameter of this flanged part 81 is larger than hole diameters of the insertion hole 74 of the valve holder 24 and the insertion hole 78 of the collar plate 25.

The projecting shaft part 82 that passes through the insertion hole 74 of the valve holder 24 and the insertion hole 78 of the collar plate 25 in their axial direction is provided for the axial part of the shaft 26. The outer diameter of this projecting shaft part 82 is smaller than the hole diameters of the insertion hole 74 of the valve holder 24 and the insertion hole 78 of the collar plate 25. The basal part (press fitting part, fitting shaft part) 83 that is press-fitted into the press fitting hole 47 that opens on the end face of the moving core 36 is provided on the other end side of the axial part of the shaft 26. An outer diameter of this basal part 83 is slightly larger than a hole diameter of the press fitting hole 47.

The diaphragm 27 has an elastic deformation part that includes a through hole 84 passing through the central part of the diaphragm 27 in the axial direction (thickness direction), and is formed from a rubber elastic body (synthetic rubber) in the shape of a thin film circular ring. This diaphragm 27 is accommodated in the hollow part of the housing in an elastically deformable manner. The hollow part is a space that is surrounded with the end face of the valve seat 28 of the valve case 21, an inner peripheral surface of the inner sleeve 63, an inner peripheral surface of the inner peripheral protrusion 65 of the solenoid case 22, and an outer peripheral surface of the end of the moving core 36. The diaphragm 27 divides the hollow part of the housing between the chamber (the in-valve communication chamber 31 and the out-of-valve communication chamber 32) that communicates with the passage hole 29, and the pressure cancel chamber 33 that is closed with respect to the outside of the valve case 21.

The in-valve communication chamber 31 is formed in the valve sleeve 71 of the valve holder 24 in a cylindrical shape with a bottom including an opening that faces the passage hole 29. The out-of-valve communication chamber 32 is provided to surround the valve sleeve 71 in the circumferential direction. The out-of-valve communication chamber 32 is formed between an outer peripheral surface of the valve sleeve 71 and an inner peripheral surface of the inner sleeve 63 of the valve case 21. The pressure cancel chamber 33 communicates with the chamber (the in-valve communication chamber 31 and the out-of-valve communication chamber 32) and the passage hole 29 through a pressure cancel passage. The pressure cancel passage includes the through holes 73 provided for the valve holder 24, the communicating passage 77 (the axial passage and the radial passage) formed between the contact surface of the moving core 36 and the partition walls 79 of the collar plate 25, and the through hole 84 passing through the central part of the diaphragm 27. The pressure cancel passage communicates between the chamber (the in-valve communication chamber 31 and the out-of-valve communication chamber 32) and the pressure cancel chamber 33.

An outer circumferential end rim (outer peripheral part) having a larger thickness than the elastic deformation part is provided radially outward of the elastic deformation part of the diaphragm 27. This outer circumferential end rim of the diaphragm 27 is an outer peripheral sealing part 85 for airtightly sealing a clearance between the valve case 21 and the solenoid case 22, and the diaphragm 27. This outer peripheral sealing part 85 is held and fixed by the valve case 21 and the solenoid case 22 with the sealing part 85 between the inner sleeve 63 of the valve case 21 and the inner peripheral protrusion 65 of the solenoid case 22. The inner circumferential end rim (inner peripheral part) having a larger thickness than the elastic deformation part is provided on a radially inward side of the elastic deformation part of the diaphragm 27. The inner circumferential end rim of the diaphragm 27 is an inner peripheral sealing part 86 for airtightly sealing a clearance between the diaphragm 27 and its adjacent members. This inner peripheral sealing part 86 is held and fixed by the valve holder 24 and the collar plate 25 with the sealing part 86 between the engaging part 76 of the valve holder 24 and the partition walls 79 of the collar plate 25.

Operation of the electromagnetic valve 3 that is incorporated into the fuel tank sealing system of the present first embodiment will be briefly described with reference to FIGS. 1 to 4B.

When the energization of the solenoid coil 34 of the electromagnetic actuator is stopped, the valve holder 24 is pressed on the valve seat 28 by the urging force of the return spring 37 (spring force) along with the moving core 36, and the rubber valve 23 supported by the valve holder 24 is engaged with the valve seat 28. Accordingly, a flow of evaporated fuel from the inlet port 52 to the passage hole 29 and the outlet port 54 is closed, so that the fuel tank 1 is sealed.

When an electric current flows through the solenoid coil 34 upon application of a drive signal to the solenoid coil 34 of the electromagnetic actuator, the magnetic flux flows through the moving core 36, the stator cores 41, 42, and the yoke 45. Accordingly, magnetic attraction force (magnetic force) which is a force that attracts the moving core 36 to the stator cores 41, 42 is produced between the moving core 36 and the magnetic attraction part of the stator cores 41, 42. When this magnetic attraction force becomes larger than the urging force of the return spring 37, the moving core 36 starts to move toward the magnetic attraction part of the stator cores 41, 42 together with the valve holder 24.

As described above, when the moving core 36 is displaced toward the magnetic attraction part, the rubber valve 23 supported by the valve holder 24 is separated (disengaged) from the valve seat 28, and the flow of evaporated fuel from the inlet port 52 to the passage hole 29 and the outlet port 54 is permitted. Accordingly, the evaporated fuel which has been evaporated (volatilized) in the fuel tank 1 flows into the electromagnetic valve 3 through the upstream part of the connecting pipe 11. Then, the evaporated fuel flows into the downstream part of the connecting pipe 11 through the inlet port 52, the out-of-valve communication chamber 32, the passage hole 29, and the outlet port 54 in this order, to be adsorbed into the adsorbent 13 in the canister 2.

Effects of the first embodiment will be described below. As described above, in the electromagnetic valve 3 that is incorporated into the fuel tank sealing system of the present embodiment, the hollow part of the housing, i.e., the hollow part formed between the end face of the valve seat 28 of the valve case 21 and the end face of the flange 43 of the stator core 42 of the electromagnetic actuator, is separated by the elastic deformation part of the diaphragm 27 between the chamber (the in-valve communication chamber 31 and the out-of-valve communication chamber 32) that communicates with the passage hole 29, and the pressure cancel chamber 33 that is cut off from the outside of the housing. The through holes 73 passing through the blocking part 72 in the axial (thickness) direction of the blocking part 72 are provided for the blocking part 72 of the valve holder 24. The through hole 84 that communicates with the chamber (the in-valve communication chamber 31 and the out-of-valve communication chamber 32) is formed at the central part of the diaphragm 27; and the communicating passage 77 that communicates between the passage hole 29 and the pressure cancel chamber 33 via the through holes 73, the through hole 84, and the chamber (the in-valve communication chamber 31 and the out-of-valve communication chamber 32) is formed between the partition walls 79 of the collar plate 25 and the contact surface of the moving core 36.

As a result, the pressure cancel chamber 33 formed in the housing communicates with the passage hole 29, the inlet port 52, and the outlet port 54 via the pressure cancel passage (the through holes 73, the through hole 84, and the communicating passage 77). Consequently, the pressure cancel chamber 33 and the passage hole 29 communicate with each other. Therefore, without reducing an intermediate portion of the pressure cancel passage (the through holes 73, the through hole 84, and the communicating passage 77) that cancels out a before-after pressure difference of the valve member (the rubber valve 23, the valve holder 24) (and before-after pressure difference of the diaphragm 27) and without adding the forming of the moving core 36, fluid such as evaporated fuel can flow between the pressure cancel chamber 33 and the passage hole 29. Thus, the pressure cancel structure that cancels out the before-after pressure difference of the valve member (the rubber valve 23, the valve holder 24) or the diaphragm 27 can be configured at low cost (without cost rising).

Figure 6:
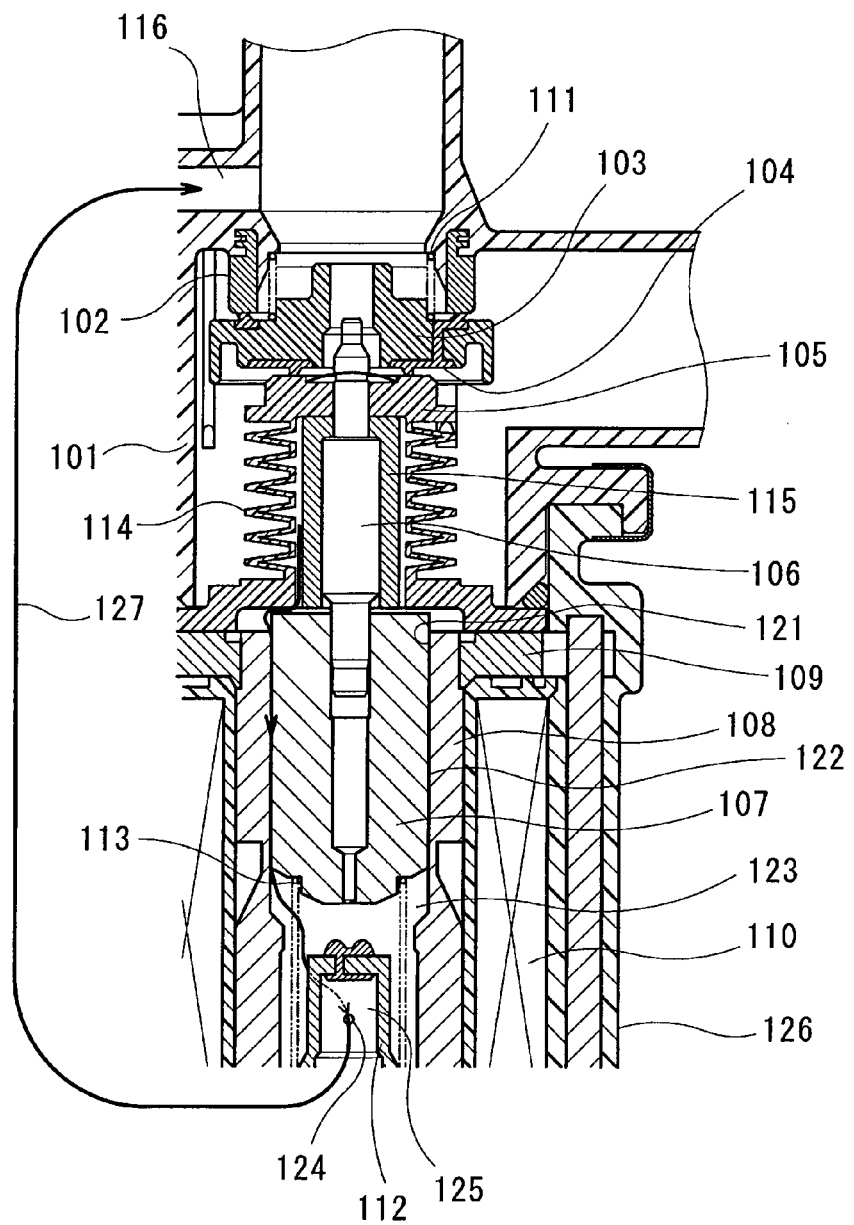
FIG. 6 is a sectional view illustrating a main structure of a first previously proposed electromagnetic valve.
Figure 7:
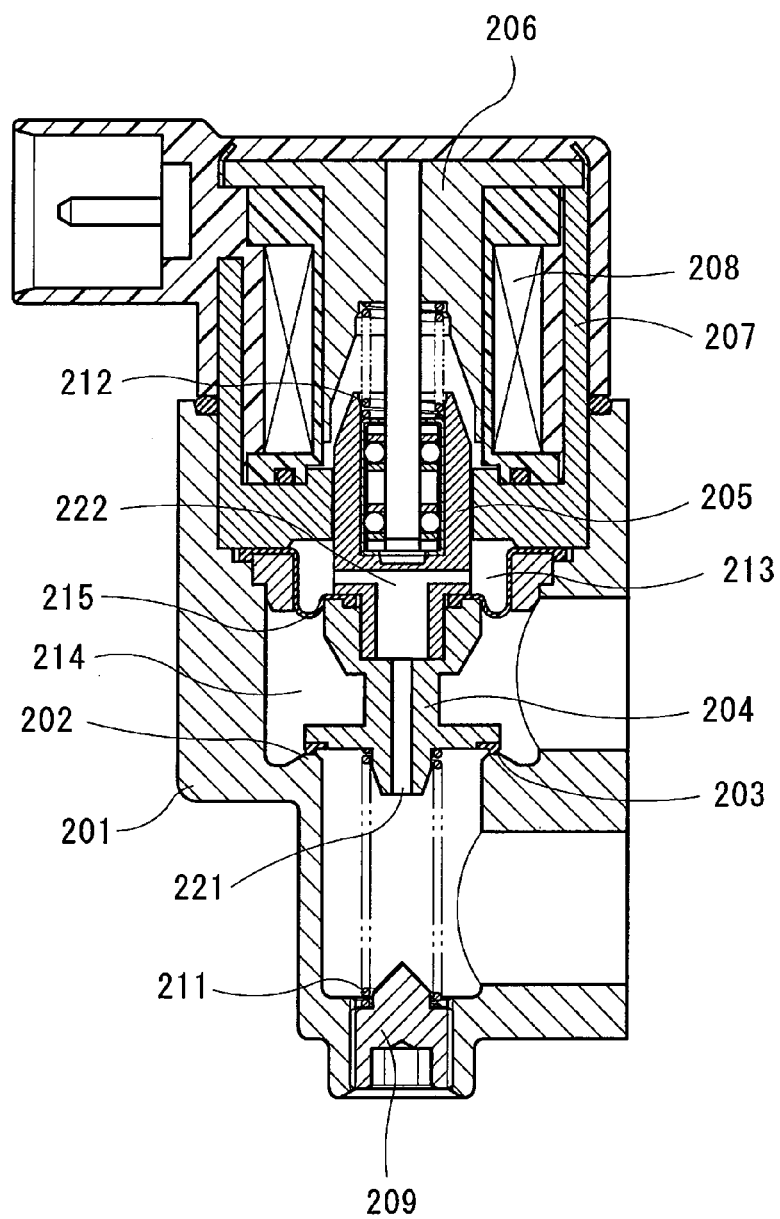
FIG. 7 is a sectional view illustrating a second previously proposed electromagnetic valve.

The pressure cancel passage having a larger passage sectional area than a clearance formed between the outer periphery of the moving core 36 and the inner periphery of the coil inner peripheral side fixed core (the stator cores 41, 42, and the magnetic resistance part 44) can be made open. Accordingly, when reciprocating the valve member (the rubber valve 23, the valve holder 24) in the axial direction, a damper effect whereby its movement speed becomes slow is not produced. Control responsivity of the valve member (valve opening responsivity or valve closing responsivity) can be made as fast as possible. In addition, the fluid in the pressure cancel chamber 33 can also quickly flow (be ventilated). Moreover, the valve member (the rubber valve 23, the valve holder 24), the diaphragm 27, and the collar plate 25 are accommodated in the housing (the valve case 21, the solenoid case 22) to be capable of reciprocating in the housing. As a result, the pressure cancel passage is formed in the housing instead of the cancel passage passing through the hose 127 (see FIG. 6) outside the housing. Therefore, the pressure cancel mechanism can be downsized (compactified) in comparison with the conventional technology. Accordingly, the entire electromagnetic valve 3 can be downsized. Thus, for example, installability of the electromagnetic valve in vehicles such as a hybrid vehicle can be improved.

Second Embodiment

A shaft 26 that integrally movably connects together a valve member (a rubber valve 23, a valve holder 24), a collar plate 25, and a moving core 36 of an electromagnetic actuator is provided for an electromagnetic valve 3 of the present embodiment. The electromagnetic actuator includes a solenoid coil 34, an external connection connector 35, a movable core (moving core) 36, a return spring 37, a coil inner peripheral side fixed core (stator cores 41, 42, and a magnetic resistance part 44), a coil outer side fixed core (yoke 45), and a stopper 46. The return spring 37 is expandably and contractably accommodated in a spring accommodating chamber 56 formed inside the coil inner peripheral side fixed core, i.e., between the moving core 36 and the stopper 46.

An axial hole 91 that passes through the core 36 in its center axis line direction to communicate between before-after spaces of the moving core 36 in its axial direction is provided for the moving core 36. A press fitting hole 47 in which a basal part 83 of the shaft 26 is press-fitted is formed on one end side of this axial hole 91 in its axial direction. An insertion hole 74 that is located coaxially with the axial hole 91, the press fitting hole 47, and the insertion hole 78 and passes through the holder 24 in the axial direction is provided for the valve holder 24. An insertion hole 78 that is located coaxially with the axial hole 91 and the press fitting hole 47 and passes through the plate 25 in the axial direction is provided for the collar plate 25. The shaft 26 includes a flanged part 81 having a larger outer diameter than a diameter of the insertion hole 74, a projecting shaft part 82 that has a smaller outer diameter than the diameter of the insertion hole 74 and passes through the insertion hole 74 and the insertion hole 78 in their axial direction, a central hole 92 that passes through the shaft 26 in the axial direction of the shaft 26 and communicates between before-after spaces of the shaft 26 in its center axis line direction, and the basal part 83 that is press-fitted into the press fitting hole 47 of the axial hole 91. The central hole 92 of the shaft 26 communicates between the chamber (the in-valve communication chamber 31 and the out-of-valve communication chamber 32) and the spring accommodating chamber 56.

As described above, in the electromagnetic valve 3 that is incorporated into the fuel tank sealing system of the present embodiment, even in the case in which the clearance between the outer periphery of the moving core 36 and the inner periphery of the coil inner peripheral side fixed core (the stator cores 41, 42, and the magnetic resistance part 44) is made small in order to increase efficiency of the magnetic circuit, at the time of the operation of the electromagnetic valve 3, fluid (e.g., air, oil) on a back side of the moving core 36 does not need to flow through the small clearance, and the fluid can pass through the central hole 92 having a larger passage sectional area than the clearance. Accordingly, at the time of reciprocating the rubber valve 23 and the valve holder 24 in the axial direction, a damper effect of slowing their movement speed is not produced. Control responsivity of the rubber valve 23 and the valve holder 24 (valve opening responsivity or valve closing responsivity) can be made as fast as possible. In addition, the fluid in the pressure cancel chamber 33 can flow more quickly than the first embodiment.

Modifications to the above embodiments will be described. In the present embodiments, the electromagnetic valve of the present disclosure is applied to, for example, the electromagnetic valve 3 that is incorporated into the fuel tank sealing system for the vehicles such as a hybrid vehicle, especially, the electromagnetic tank sealing valve. However, alternatively, the electromagnetic valve of the present disclosure may be applied to the other electromagnetic valves (electromagnetic control valve) such as the purge control valve 4 and the canister control valve 6 which are incorporated into the evaporated fuel processor. Not only gases such as air and evaporated fuel, but also gas such as gas phase refrigerant, water, fuel, oil, liquid such as liquid phase refrigerant, or fluid in a gas-liquid two phase state can be used for the fluid. Moreover, a lift amount of the valve member may be made larger or smaller in accordance with the increase of the value of voltage or electric current to the coil. In this case, the valve member serves as a valving element of an electromagnetic flow control valve.

Figure 5:
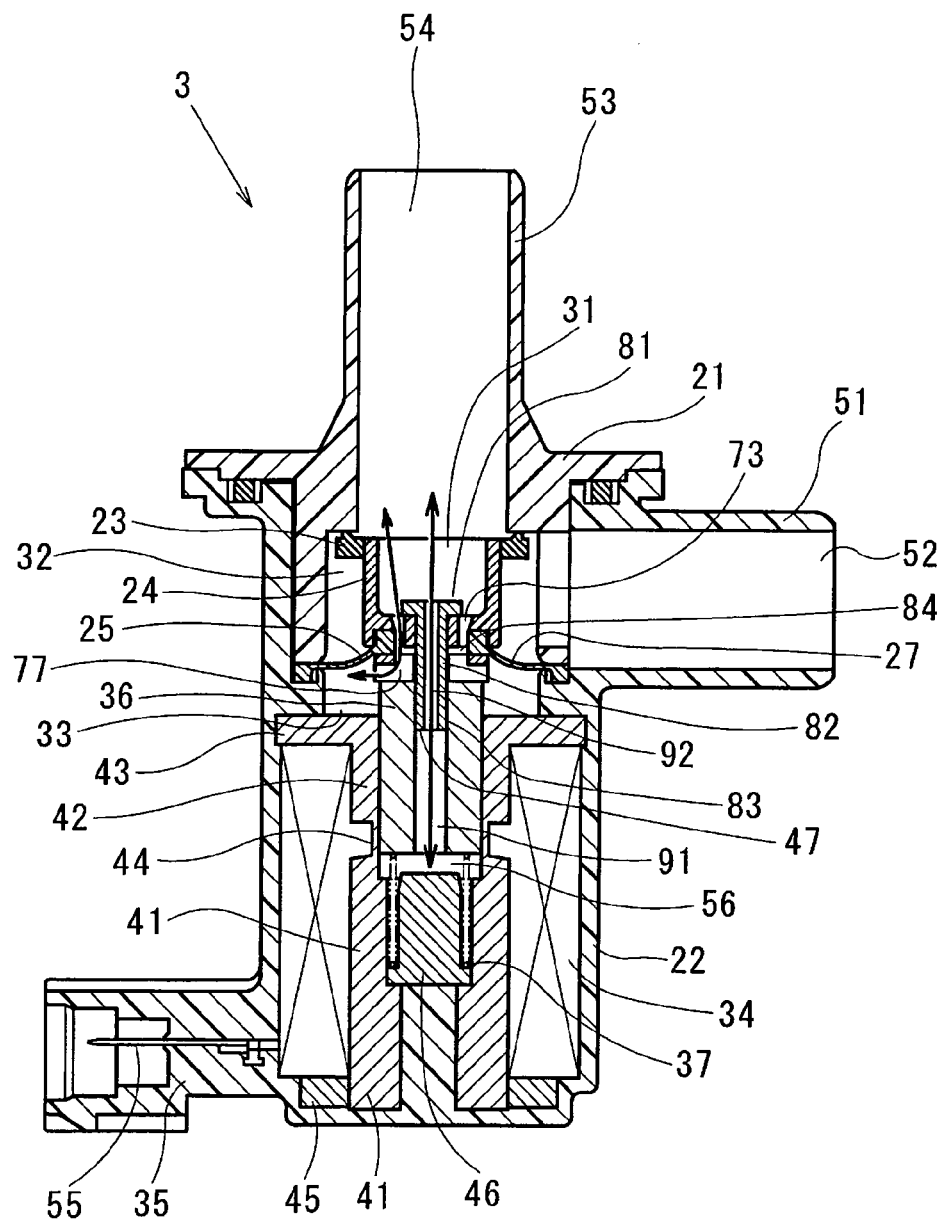
FIG. 5 is a sectional view illustrating an electromagnetic valve which is applied to an electromagnetic tank sealing valve in accordance with a second embodiment.

In the present embodiments, the electromagnetic valve of the present disclosure is applied to the electromagnetic control valve of such a type (i.e., normally-closed type) that, when the moving core (movable core) 36 is attracted to the back side (lower side in FIGS. 2, 3B, and 5) in the axial direction by the magnetic force of the solenoid coil 34 of the electromagnetic actuator, the valve member synchronized with the operation of the moving core 36 is opened. Alternatively, the electromagnetic valve of the present disclosure may be applied to an electromagnetic control valve of such a type (i.e., normally-open type) that, when the movable core is attracted to the back side (one side or the other side) in the axial direction by the magnetic force of the coil of the actuator, the valve member that is in synchronization with the operation of the movable core is closed. In the present embodiments, the valve member includes the rubber valve (valving element) 23 and the valve holder (valving element supporting member) 24. Alternatively, the valve member may be constituted of the valve (valving element) alone.

In the present embodiments, the film-like diaphragm 27 is employed for a dividing (sealing) unit for dividing the inside of the hollow part of the housing into the two chambers (spaces) including the chamber (the in-valve communication chamber 31 and the out-of-valve communication chamber 32) that can communicate with the passage hole 29, and the cancel chamber 33 that is cut off airtightly from the outside environment of the electromagnetic valve 3. Alternatively, a bellows may be used for the dividing (sealing) unit for dividing the inside of the hollow part of the housing into the two chambers (spaces) including the chamber that can communicate with the passage, and the cancel chamber that is cut off from the outside.

To sum up, the electromagnetic valve 3 of the above embodiments can be described as follows.

The electromagnetic valve 3 in the first aspect includes the valve member 23, 24 that reciprocates in its axial direction to open or close the passage 29, 52, 54 through which fluid flows; and the actuator having the coil 34 that generates magnetic force that attracts the movable core 36 upon supply of electric power. The actuator includes the movable core 36 that is displaced in the axial direction by the magnetic force generated in the coil 34 to drive the valve member 23, 24 (in the valve-opening direction or valve-closing direction). The electromagnetic valve 3 includes the intermediate member 25 disposed between the valve member 23, 24 and the movable core 36; the connecting member 26 that connects together the valve member 23, 24, the movable core 36, and the intermediate member 25 so that they can integrally move; and the housing 21, 22 that accommodates the valve member 23, 24, the movable core 36, the intermediate member 25, and the connecting member 26 so that they can reciprocate therein.

The housing 21, 22 includes the hollow part that communicates with the passages 29, 52, 54 between the housing 21, 22 and the actuator 34, 36, 41, 42, 44, 37, 56. The valve member 23, 24 or the intermediate member 25 includes a dividing unit (e.g., filmy diaphragm or bellows) for dividing the inside of the hollow part of the housing 21, 22 between (the two chambers (spaces) including) the communicating chamber 31, 32 that can communicate with the passage 29, 52, 54, and the cancel chamber 33 that is cut off from the outside. The dividing unit 27 includes the through hole 84 that passes through (its central part) in the axial direction (film thickness direction, before-after direction, dividing direction, thickness direction, board thickness direction, bellows direction, cylinder direction, or center line direction). The intermediate member 25 includes the communicating passage 77 between the intermediate member 25 and the movable core 36. This communicating passage 77 communicates between the passage 29, 52, 54 and the cancel chamber 33 through the through hole 84 of the dividing unit 27 and the communicating chamber 31, 32.

Accordingly, by providing the through hole 84 communicating with the communicating chamber 31, 32 for the dividing unit 27; and by forming the communicating passage 77 that communicates between the passage 29, 52, 54 and the cancel chamber 33 through the through hole 84 and the communicating chamber 31, 32, between the intermediate member 25 and the movable core 36, the cancel chamber 33 and the passage 29, 52, 54 communicate with each other. As a result, without reducing the pressure cancel passage 73, 84, 77, 31, 32 that cancels out the before-after pressure difference of the valve member 23, 24 (and the before-after pressure difference of the dividing unit 27), and without adding the forming of the movable core 36, the fluid can flow between the cancel chamber 33 and the passage 29, 52, 54. Therefore, the pressure cancel structure that cancels out the before-after pressure difference of the valve member 23, 24 (or the dividing unit 27) can be configured at low cost (without cost rising).

In addition, by accommodating the valve member 23, 24, the dividing unit 27, and the intermediate member 25 inside the housing 21, 22 so that they can reciprocate in the housing 21, 22, the pressure cancel passage 73, 84, 77, 31, 32 is formed inside the housing 21, 22 instead of a configuration passing through the hose outside the housing 21, 22. Therefore, the pressure cancel mechanism can be downsized (compactified) in comparison with the conventional technology. Accordingly, the entire electromagnetic valve 3 can be downsized. Thus, installability of the entire electromagnetic valve 3 in a vehicle, for example can be improved. Furthermore, the fluid can flow through the pressure cancel passage 73, 84, 77, 31, 32 which is larger than the clearance formed between the movable core 36 and the fixed core 41, 42, 44. Accordingly, at the time of reciprocating the valve member 23, 24 in the axial direction, a damper effect of slowing their movement speed is not caused. The control responsivity of the valve member 23, 24 (valve opening responsivity or valve closing responsivity) can be made as fast as possible. In addition, the fluid of the cancel chamber 33 can also flow quickly.

According to the electromagnetic valve 3 in the second aspect, the three spaces (passages) including the through hole 84, the communicating chamber 31, 32, and the communicating passage 77 is configured as the pressure cancel passage 73, 84, 77, 31, 32 that communicates between the passage 29, 52, 54 through which the fluid flows, and the cancel chamber 33. According to the electromagnetic valve 3 in the third aspect, the intermediate member 25 is configured as a separate component from the movable core 36 and the valve member 23, 24. Accordingly, the movable core 36 can be formed (manufactured) from a magnetic material, and the intermediate member 25 can be formed (manufactured) from a nonmagnetic material. According to the electromagnetic valve 3 in the fourth aspect, the electromagnetic valve 3 includes the valve member 23, 24 having the valving element 23 (e.g., rubber valve 23) that is engageable with the opening circumferential edge of the passage 29, 52, 54, and the valving element supporting member 24 (e.g., valve holder 24) in a cylindrical shape (with a bottom) supporting (holding) this valving element 23. The valving element 23 is fixed along the outer periphery of the valving element supporting member 24. In the case where the annular valve seat 28 is formed along the opening circumferential edge of the passage (hole) 29 provided for the housing 21, 22 (e.g., valve case 21), the valving element 23 is disposed to be displaced relative to the housing 21, and is engaged with or disengaged from the valve seat 28 to close or open the passage (hole) 29.

According to the electromagnetic valve 3 in the fifth aspect, the electromagnetic valve 3 includes the movable core 36 having the press fitting hole 47 that opens on a contact surface with which the intermediate member 25 is in contact and extends from this opening side to the back side in the axial direction. The intermediate member 25 includes the first insertion hole 78 that is located coaxially with the press fitting hole 47 of the movable core 36 and passes (through the central part of the intermediate member 25) in the axial direction. The valving element supporting member 24 includes the second insertion hole 74 that is located coaxially with the press fitting hole 47 of the movable core 36 and the first insertion hole 78 of the intermediate member 25 and passes through (the central part of the valving element supporting member 24) in the axial direction. According to the electromagnetic valve 3 in the sixth aspect, the electromagnetic valve 3 includes the connecting member 26 having the basal part 83 that is press-fitted into the press fitting hole 47; the shaft part 82 whose outer diameter is smaller than the diameter of the first insertion hole 78 and the diameter of the second insertion hole 74 and which passes through the first and second insertion holes 78, 74 in their axial direction; and the flanged part 81 whose outer diameter is larger than the diameters of the first and second insertion holes 78, 74.

According to the electromagnetic valve 3 in the seventh aspect, the electromagnetic valve 3 includes the axial hole 91 that communicates between the before-after spaces of the movable core 36 in its axial direction. The axial hole 91 passes through the movable core 36 in its axial direction. The intermediate member 25 includes the (cross-shaped) first insertion hole 78 that is located coaxially with the press fitting hole 47 of the movable core 36 and passes (through the central part of the intermediate member 25) in the axial direction. The valving element supporting member 24 includes the second insertion hole 74 that is located coaxially with the press fitting hole 47 of the movable core 36 and the first insertion hole 78 of the intermediate member 25 and passes (through the central part of the valving element supporting member 24) in the axial direction. According to the electromagnetic valve 3 in the eighth aspect, the electromagnetic valve 3 includes the central hole 92 passing through the connecting member 26 in the axial direction of the connecting member 26 to communicate between the before-after spaces of the connecting member 26 in its axial direction; the basal part 83 press-fitted in the axial hole 91 of the movable core 36; the shaft part 82 whose outer diameter is smaller than the diameters of the first and second insertion holes 78, 74 and which passes through the first and second insertion holes 78, 74 in their axial direction; and the flanged part 81 whose outer diameter is larger than the diameters of the first and second insertion holes 78, 74.

According to the electromagnetic valve 3 in the ninth aspect, the electromagnetic valve 3 includes the actuator 34, 36, 41, 42, 44, 37, 56 having the fixed core 41, 42, 44 that slidably holds the movable core 36 and forms a magnetic path on an inner peripheral side of the coil 34, the spring 37 that urges the movable core 36 in a direction to close the passage 29, 52, 54 by the valve member 23, 24, and the spring chamber 56 in which this spring 37 is accommodated. The central hole 92 communicates between the communicating chamber 31, 32 and the spring chamber 56. Even if the clearance between the movable core 36, and the fixed core 41, 42, 44 is made small in order to increase efficiency of the magnetic circuit, at the time of operation of the valving element 23, the fluid (e.g., air, oil) on the back side of the movable core 36 does not need to pass through the small clearance, and can pass through the large central hole 92. Accordingly, at the time of reciprocating the valve member 23, 24 in the axial direction, a damper effect of slowing their movement speed is not caused. The control responsivity of the valve member 23, 24 (valve opening responsivity or valve closing responsivity) can be made as fast as possible. In addition, the fluid of the cancel chamber 33 can also flow quickly.

According to the electromagnetic valve 3 in the tenth aspect, the housing 21, 22 that defines the hollow part between the housing 21, 22 and the actuator 34, 36, 41, 42, 44, 37, 56 is configured by the two divided cases including the solenoid case 22 in a cylindrical shape (with a bottom) in which the movable core 36 is accommodated, and the cylindrical valve case 21 in which the valve member 23, 24 is accommodated. The solenoid case 22 is configured integrally from, for example, a resin material or metal material having insulation properties, and includes a cylindrical peripheral wall part that surrounds the valve case 21 in the circumferential direction. The valve case 21 is configured integrally from, for example, a resin material or metal material having insulation properties. A joined portion between the valve case 21 and the solenoid case 22 is airtightly sealed.

According to the electromagnetic valve 3 in the eleventh aspect, the annular dividing unit 27 may be formed from, for example, an elastically deformable rubber elastic body (synthetic rubber). An outer circumferential end rim of the annular dividing unit 27 is held (supported) between the solenoid case 22 and the valve case 21. The inner circumferential end rim of the annular dividing unit 27 is held (supported) between the intermediate member 25 and the valve member 23, 24. According to the electromagnetic valve 3 in the twelfth aspect, the electromagnetic valve 3 includes the actuator 34, 36, 41, 42, 44, 37, 56 having the fixed core 41, 42, 44 (e.g., stator core 41) that slidably supports the movable core 36 and forms the magnetic path on the inner peripheral side of the coil 34. The fixed core (e.g., yoke 45) that forms the magnetic path on the outer peripheral side of the coil 34 may be added to the actuator 34, 36, 41, 42, 44, 37, 56.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electromagnetic valve comprising:
   a flow passage through which fluid flows;
   a valve member that reciprocates in its axial direction to open or close the flow passage;
   an actuator that includes:
   a coil which is configured to generate magnetic force upon supply of electric power; and
   a movable core which is displaced in the axial direction due to the magnetic force generated by the coil so as to drive the valve member;
   an intermediate member that is disposed between the valve member and the movable core;
   a connecting member that connects together the valve member, the movable core, and the intermediate member in an integrally movable manner;
   a housing that accommodates the valve member, the movable core, the intermediate member, and the connecting member in a reciprocatable manner and that includes a hollow part between the housing and the actuator, the hollow part communicating with the flow passage; and
   a dividing unit that is provided for the valve member or the intermediate member and includes a through hole which passes through the dividing unit in its axial direction, wherein:
   the dividing unit divides the hollow part between a communicating chamber that is capable of communicating with the flow passage, and a cancel chamber that is cut off from an outside thereof;
the intermediate member includes a communicating passage between the intermediate member and the movable core;
the communicating passage communicates between the flow passage and the cancel chamber via the through hole and the communicating chamber;
the valve member includes:
an annular valving element that is engageable with an opening circumferential edge of the flow passage; and
a cylindrical valving element supporting member that supports the valving element;
the valving element is fixed to an outer periphery of the valving element supporting member;
the movable core includes an axial hole that passes through the movable core in its axial direction;
the axial hole communicates between a pre-movable core space from which fluid flows toward the movable core, and a post-movable core space into which fluid flows from the movable core in the axial direction;
the movable core further includes a press-fitting hole which is a part of the axial hole on the intermediate member-side;
the intermediate member further includes a first insertion hole that is located coaxially with the press-fitting hole and that passes through the intermediate member in an axial direction thereof; and
the valving element supporting member includes a second insertion hole that is located coaxially with the press-fitting hole and the first insertion hole and that passes through the valving element supporting member in the axial direction.

2. The electromagnetic valve according to claim 1, wherein three spaces made up of the through hole, the communicating chamber, and the communicating passage constitute a pressure cancel passage that communicates between the flow passage and the cancel chamber.

3. The electromagnetic valve according to claim 1, wherein the intermediate member is configured as a separate component from the movable core and the valve member.

4. The electromagnetic valve according to claim 1, wherein:
the movable core includes a press-fitting hole that opens on a contact surface of the movable core with the intermediate member and that extends from an opening side toward an inside of the movable core in the axial direction thereof;
the intermediate member further includes a first insertion hole that is located coaxially with the press-fitting hole and that passes through the intermediate member in an axial direction thereof; and
the valving element supporting member includes a second insertion hole that is located coaxially with the press-fitting hole and the first insertion hole and that passes through the valving element supporting member in the axial direction.

5. The electromagnetic valve according to claim 4, wherein the connecting member includes:
a basal part which is press-fitted into the press-fitting hole;
a shaft part whose outer diameter is smaller than a diameter of the first insertion hole and a diameter of the second insertion hole and which passes through the first and second insertion holes in their axial direction; and
a flanged part whose outer diameter is larger than the diameters of the first and second insertion holes.

6. The electromagnetic valve according to claim 1, wherein the connecting member includes:
a central hole that passes through the connecting member in its axial direction and that communicates between a pre-connecting member space from which fluid flows toward the connecting member, and a post-connecting member space into which fluid flows from the connecting member in the axial direction;
a basal part which is press-fitted into the axial hole;
a shaft part whose outer diameter is smaller than a diameter of the first insertion hole and a diameter of the second insertion hole and which passes through the first and second insertion holes in their axial direction; and
a flanged part whose outer diameter is larger than the diameters of the first and second insertion holes.

7. The electromagnetic valve according to claim 6, wherein:
the actuator further includes:
a fixed core that slidably holds the movable core and forms a magnetic path on an inner peripheral side of the coil;
a spring that urges the movable core in such a direction that the valve member closes the flow passage; and
a spring chamber that accommodates the spring; and
the central hole communicates between the communicating chamber and the spring chamber.

8. The electromagnetic valve according to claim 1, wherein:
the housing further includes:
a cylindrical solenoid case that accommodates therein the movable core; and
a cylindrical valve case that accommodates therein the valve member; and
the solenoid case includes a cylindrical peripheral wall part which surrounds the valve case in a circumferential direction thereof.

9. The electromagnetic valve according to claim 8, wherein the dividing unit further includes:
an outer circumferential end rim that is held between the solenoid case and the valve case; and
an inner circumferential end rim that is held between the intermediate member and the valve member.

10. The electromagnetic valve according to claim 1, wherein the actuator further includes a fixed core that slidably holds the movable core and that forms a magnetic path on an inner peripheral side of the coil.

* * * * *